United States Patent
Yarovoy (10) Patent No.: US 10,379,781 B2
(45) Date of Patent: Aug. 13, 2019

(54) STORAGE SYSTEM AND METHOD FOR IMPROVED COMMAND FLOW

(71) Applicant: SanDisk Technologies LLC, Plano, TX (US)

(72) Inventor: Boris Yarovoy, Maalot-Tarshiha (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 33 days.

(21) Appl. No.: 15/134,104

(22) Filed: Apr. 20, 2016

(65) Prior Publication Data

US 2017/0308326 A1    Oct. 26, 2017

(51) Int. Cl.
*G06F 3/06* (2006.01)
*G06F 11/30* (2006.01)

(52) U.S. Cl.
CPC ............ *G06F 3/0659* (2013.01); *G06F 3/061* (2013.01); *G06F 3/0653* (2013.01); *G06F 3/0688* (2013.01); *G06F 3/0604* (2013.01); *G06F 3/0683* (2013.01); *G06F 11/3055* (2013.01)

(58) Field of Classification Search
CPC .... G06F 3/0659; G06F 3/0604; G06F 3/0683; G06F 3/061; G06F 3/0653; G06F 3/0688; G06F 11/3055
See application file for complete search history.

(56) References Cited

U.S. PATENT DOCUMENTS

| | | | | |
|---|---|---|---|---|
| 9,519,440 B2* | 12/2016 | Shacham | ............ | G06F 13/4243 |
| 2010/0332855 A1* | 12/2010 | Dolgunov | ............ | G06F 13/385 |
| | | | | 713/194 |
| 2015/0094875 A1* | 4/2015 | Duzly | ............ | G06F 3/0614 |
| | | | | 700/300 |
| 2015/0212738 A1* | 7/2015 | D'Eliseo | ............ | G06F 3/0659 |
| | | | | 711/154 |

OTHER PUBLICATIONS

"Embedded Multi-Media Card ($e$ •MMC) Electrical Standard (5.1)", JESD84-B51 (Revision of JESD84-B50 Jul. 1, 2014), JEDEC Solid State Technology Association, dated Feb. 2015, 88 pgs.

* cited by examiner

*Primary Examiner* — Masud K Khan
(74) *Attorney, Agent, or Firm* — Loza & Loza, LLP; Gabriel Fitch (57) ABSTRACT

A storage system and method for improved command flow are provided. In one embodiment, a storage system receives a request from a host for an indication of which command(s) stored in the storage system are ready for execution; in response to the request, provides the host with the indication of which command(s) stored in the storage system are ready for execution; receives an instruction from the host to execute a command that is ready for execution; and in response to the instruction from the host to execute the command, performs both of the following: executes the command and provides the host with an updated indication of which command(s) stored in the storage system are ready for execution, wherein the storage system provides the host (Continued)

with the updated indication without receiving a separate request from the host for the updated indication. Other embodiments are provided.

19 Claims, 7 Drawing Sheets

STORAGE SYSTEM AND METHOD FOR IMPROVED COMMAND FLOW

BACKGROUND

Some storage systems operate under an industry standard, such as the Embedded Multi-Media Card (eMMC) standard. One feature of that standard is a command queuing feature, in which a host sends a new read or write command to the storage system, and the storage system stores the command in a queue and begins processing it, while previous commands are in process or in the queue. When the storage system completes its processing of the command, the storage system sets an indication in a specific register (e.g., a queue status register). The host can send a status query to the storage system to check the status of the processing of the commands in the queue, and, in response to such a request, the storage system returns to the host the contents of the queue status register, which indicates which command(s) in the queue are ready to be executed. The host then selects a command and instructs the storage system to execute it, which can result is a data transfer between the host and the storage system. After this instruction is sent, the host can send an additional status query to the storage system to determine what other command(s) in the queue are ready to be executed. This cycle of the host sending a status query and instructing the storage system to execute a command continues until the host has executed all of the commands in the queue.

DETAILED DESCRIPTION OF THE PRESENTLY PREFERRED EMBODIMENTS

Overview

Embodiments of the present invention are defined by the claims, and nothing in this section should be taken as a limitation on those claims.

By way of introduction, the below embodiments relate to a storage system and method for improved command flow. In one embodiment, a method for improved command flow in a storage system is provided. In this method, a storage system receives a request from a host for an indication of which command(s) stored in the storage system are ready for execution; in response to the request, provides the host with the indication of which command(s) stored in the storage system are ready for execution; receives an instruction from the host to execute a command that is ready for execution; and in response to the instruction from the host to execute the command, performs both of the following: executing the command and providing the host with an updated indication of which command(s) stored in the storage system are ready for execution, wherein the storage system provides the host with the updated indication without receiving a separate request from the host for the updated indication.

In some embodiments, the command(s) are stored in a queue in the storage system.

In some embodiments, the indication of which command(s) stored in the storage system are ready for execution is stored in a register in the storage system.

In some embodiments, the storage system provides the host with the updated indication instead of an acknowledgement response to the instruction.

In some embodiments, the storage system comprises a three-dimensional memory.

In some embodiments, the storage system is embedded in the host.

In some embodiments, the storage system is removably connected to the host.

In another embodiment, a storage system is presented comprising a memory; a command queue; a queue status register; and a processor in communication with the memory, the command queue, and the queue status register. The processor is configured to: store a command received from a host in the command queue; process the command; store an indication in the queue status register that the command is ready for execution; receive a status request from the host; in response to receiving the status request from the host, provide the host with content of the queue status register; receive an instruction from the host to execute a command in the command queue that is ready for execution; and in response to receiving an instruction from the host to execute the command, execute the command and provide the host with updated content of the queue status register instead of an acknowledgement response to the instruction.

In some embodiments, the updated content of the queue status register is provided without receiving a separate status request from the host.

In some embodiments, the memory comprises a three-dimensional memory.

In some embodiments, the storage system is embedded in the host.

In some embodiments, the storage system is removably connected to the host.

In another embodiment, a storage system is provided comprising means for storing and processing commands; means for storing a status of the processing of the commands; and means for providing the status of the processing of the commands in response to an instruction from a host to execute one of the commands.

In some embodiments, the status of the processing of the commands is provided to the host without receiving a specific request from the host for the status.

In some embodiments, the status of the processing of the commands is provided to the host instead of an acknowledgement response to the instruction.

In some embodiments, the means for storing and processing commands comprises a queue.

In some embodiments, the means for storing the status of the processing of the commands comprises a register.

In some embodiments, the storage system comprises a three-dimensional memory.

In some embodiments, the storage system is embedded in the host.

In some embodiments, the storage system is removably connected to the host.

Other embodiments are possible, and each of the embodiments can be used alone or together in combination. Accordingly, various embodiments will now be described with reference to the attached drawings.

EXEMPLARY EMBODIMENTS

Figures 1A, 1B:
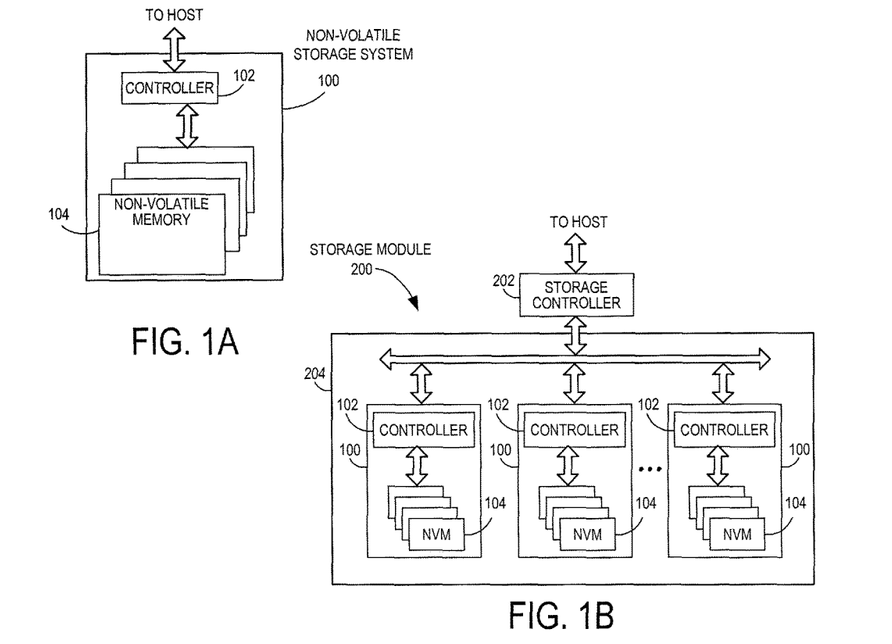
FIG. 1A is a block diagram of a non-volatile storage system of an embodiment.
FIG. 1B is a block diagram illustrating an exemplary storage module of an embodiment.
Figure 1C:
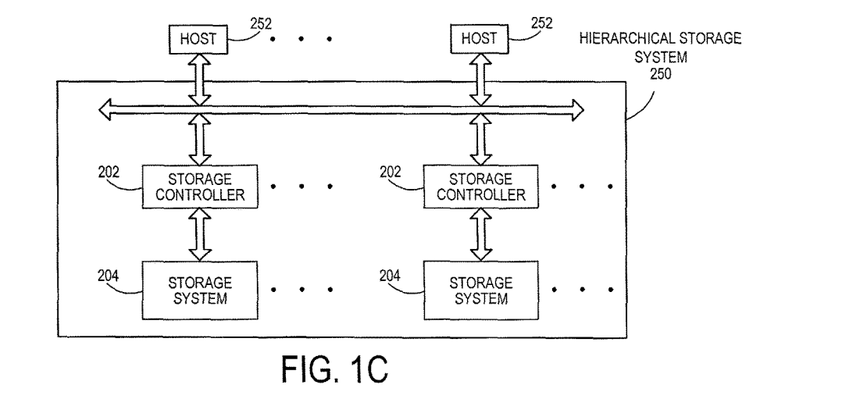
FIG. 1C is a block diagram illustrating a hierarchical storage system of an embodiment.

Memory systems suitable for use in implementing aspects of these embodiments are shown in FIGS. 1A-1C. FIG. 1A is a block diagram illustrating a non-volatile memory system according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
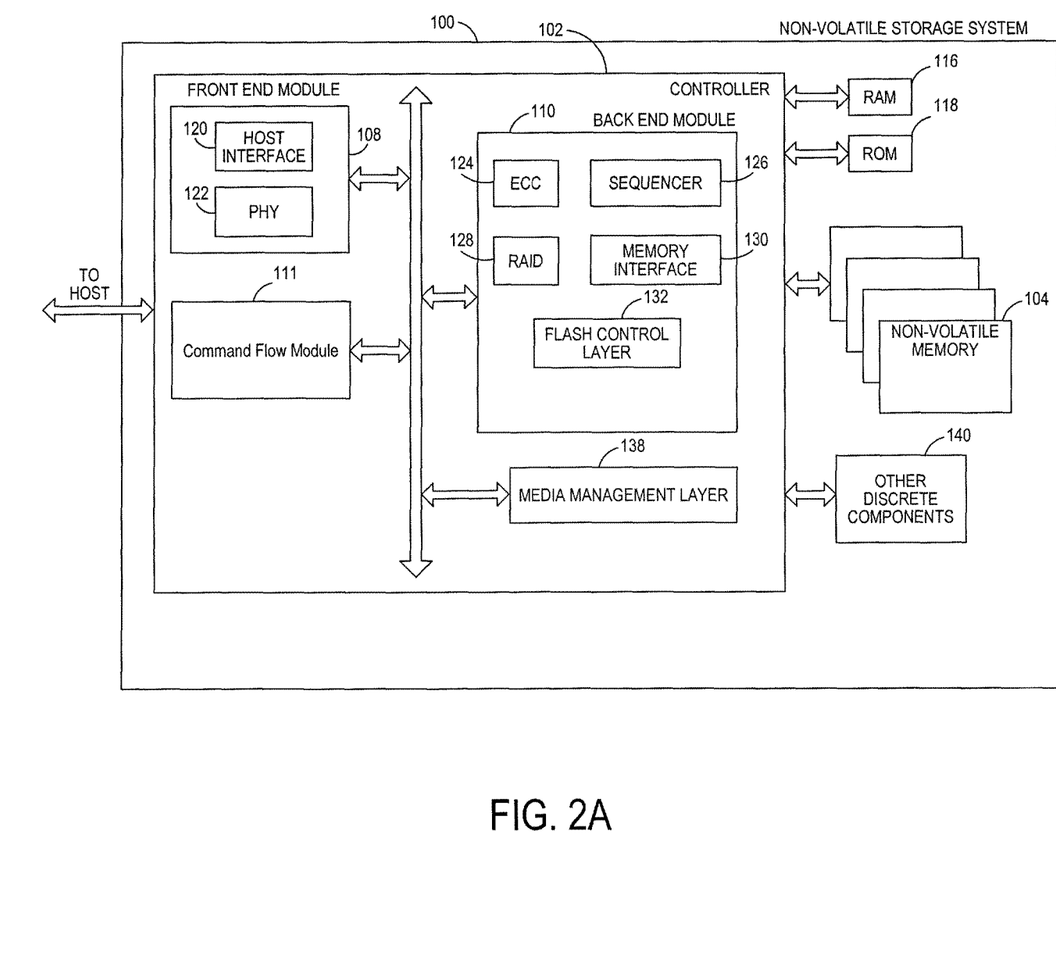
FIG. 2A is a block diagram illustrating exemplary components of the controller of the non-volatile storage system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and a command flow module 111 (which, as discussed below, can be configured to send the content of a queue status register to the host 252 in response to a read or write command, instead of waiting for a separate, specific request from the host 252). A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
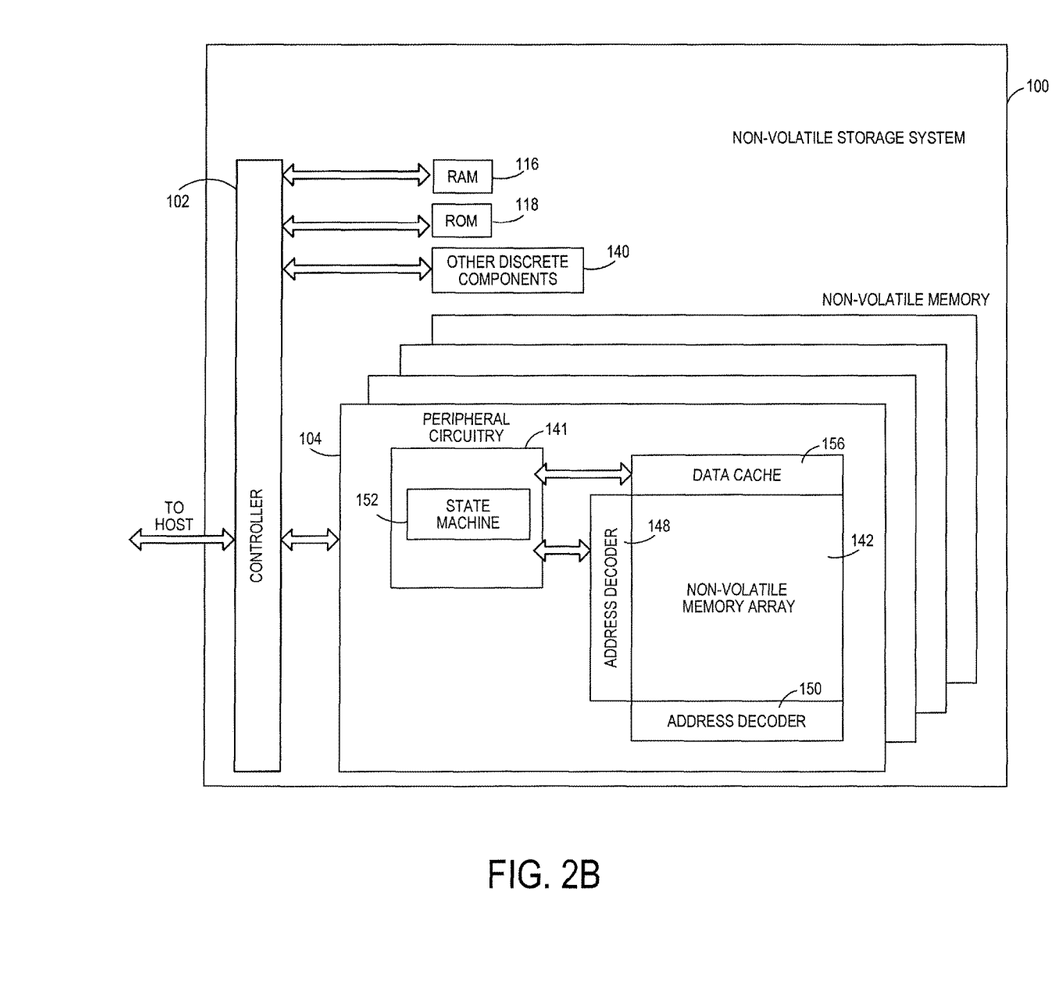
FIG. 2B is a block diagram illustrating exemplary components of the non-volatile memory of the non-volatile storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. In one embodiment, the peripheral circuitry 141 also includes a data latch control module 154 configured to move only a portion of the data from a first data latch to an available location in a second data latch. This module will be discussed in more detail below. Non-volatile memory die 104 further includes a data cache 156 that caches data.

Merely for illustration purposes, the storage system 100 (sometimes referred to as a "storage device" or just "device") in this embodiment is implemented using the Embedded Multi-Media Card (eMMC) standard. As such, the storage system 100 may sometimes be referred to herein as the eMMC device. Some of the terminology used below is in accordance with the Embedded Multi-Media Card (eMMC) Electrical Standard (5.1) (JESD84-B51), February 2015. Of course, use of the eMMC standard is merely to illustrate one particular embodiment, and other standards can be used. Thus, it should be understood that the eMMC standard and its details should not be read into the claims, unless expressly recited therein.

Figure 3:
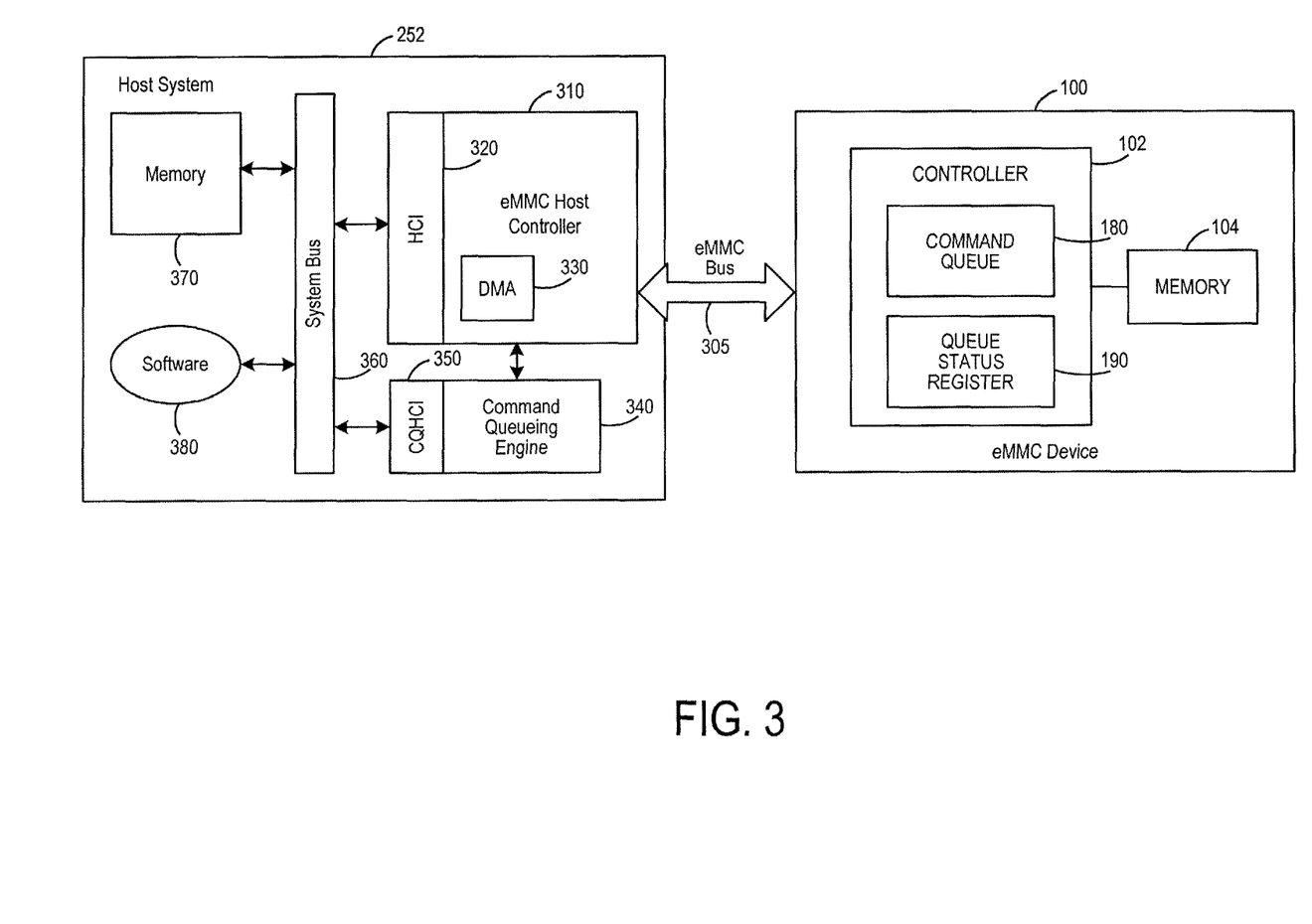
FIG. 3 is block diagram of a host and storage system of an embodiment.

FIG. 3 is a block diagram illustrating some components in the storage device 100 and host system (or "host") 252 in implementing the eMMC standard. For example, in one embodiment, the storage system 100 comprises a command queue 180 and a queue status register 190 in its controller 102 (although one or more of the components can be located outside of the controller 102). The storage system 100 is in communication with the host 252 via an eMMC bus 305. (As used herein, "in communication with" can mean in direct communication with or in indirect communication with through one or more components (discussed or not discussed herein).) In one embodiment, the eMMC bus 305 comprise a command portion and a data portion. The host 252 comprises an eMMC host controller 310 (with a host controller interface (HCI) 320 and a DMA controller 330) and a command queueing engine 340 (with a command queueing host controller interface (CQHCI) 360), both of which are in communication, via a system bus 360, with a memory 370 and software 380. The command queueing engine 340 can receive tasks from the software 380 via a task descriptor list in memory 370 and a doorbell register (not shown). In one embodiment, the eMMC host controller 310 (with its DMA 330) and the command queueing engine 340 execute the bus protocol and provides a task-level interface to the software 380, and the software 380 issues tasks to the controller 310 and engine 340 and is notified when they are completed. In one embodiment, both the controller 310 and engine 340 are hardware components, but variations are possible.

One feature of the eMMC standard is a command queuing feature. (The terms "command," "request," and "task" will be used interchangeably herein.) In general, the host 252 sends a new read or write command to the storage system 100, which can occur while previously-sent commands are in the queue 180 or in process in the storage system 100. The storage system 100 stores the command in the command queue 180 and begins to process the command. The controller 102 can process the command in any suitable way. Examples of how a command can be processed include, but are not limited to, determining if the address in the command is legal (e.g., in the boundaries of a partition that the host 252 is authorized to access), parsing out parameters included in the command, mapping the logical address in the command to a physical address, etc. When the storage system 100 is done processing the command, it stores a bit in the queue status register (QSR) 190 to indicate that the command has been processed. The host 252 can then instruct the storage system 100 to execute the command. Although this example and the following examples will be discussed in terms of a single command, it should be understood that the host 252 can send the storage system 100 several commands for storage in the command queue 180 (in one illustrative embodiment, the command queue 180 can hold 32 commands; other sizes can be used).

Figure 4:
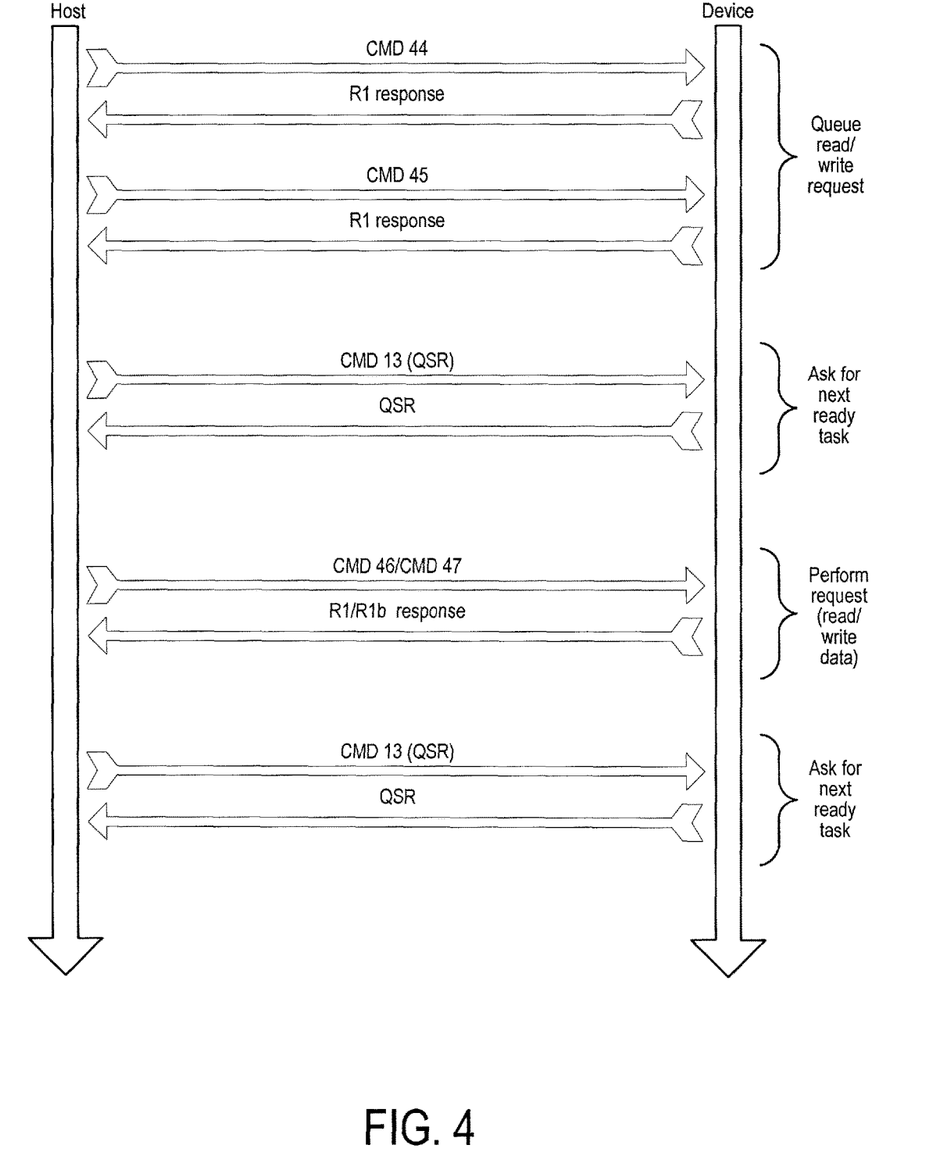
FIG. 4 is a flow chart of a command-queueing-and-execution process of an embodiment.

FIG. 4 is a flow chart that illustrates the communication between the host 252 and the storage system 100 in one embodiment. Under the eMMC specification, the host 252 queues a read or write command in the storage system 100 by sending command CMD 44 and CMD 45, in response to each the storage system 100 sends an R1 response. According to that specification, CMD 44 is the first step in queuing a data transfer task and encodes parameters for queuing the task and executing the operation. The arguments in CMD 44 can include one or more of the following: Block Count, Task ID, Priority, Data Direction, and additional parameters (i.e., Tag Request, Context ID, Reliable Write, Forced Programming).

R1 is a normal response command that the storage system 100 issues when it receives a command. The R1 response can include the index of the command being responded too, as well as the status of the storage system 100. The status of the storage system 100 can include an error bit that signals that an error has occurred in the storage system 100. As will be discussed in more detail below, an error can be detected by the storage system 100 either during the command interpretation and validation phase (Response Mode) or during the command execution phase (Execution Mode). In one embodiment, response mode exceptions (e.g., address out of range, write protect error, illegal command indication) are reported in the response to the command that raised the exception, whereas execution mode exceptions are reported in the response to a STOP_TRANSMISSION command used to terminate the operation or in the response to a SEND_STATUS command issued while the operation is being carried out or after the operation is completed. When an error bit is detected in Response Mode, the storage system 100 can report the error in the response to the command that raised the exception, in which case the command may not be executed, and the associated state transition may not take place. However, when an error is detected in Execution Mode, the execution is terminated, and the error may be reported in the response to the next command.

Figure 5:
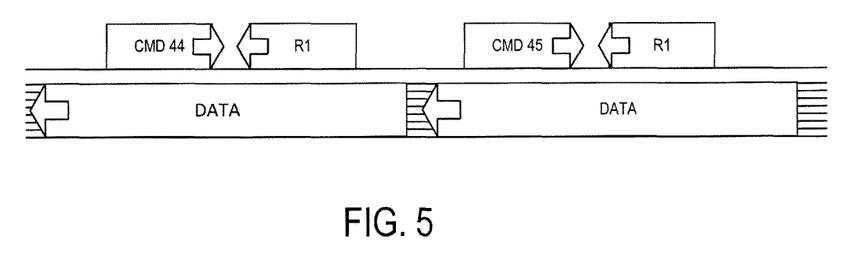
FIG. 5 is a diagram illustrating the queuing of a command of an embodiment.

Assuming the R1 response comes back normal, the host 252 next sends CMD45. As shown in FIG. 5, command and response communications between the host 252 and the storage system 100 occur over the command portion of the bus 305. So, commands can be communicated even when the data portion of the bus 305 is busy. In one embodiment, the argument of CMD45 is the start block address for the related transaction (e.g., the transactional logical block address (LBA)). After receiving CMD45, the storage system 100 queues the task with parameters (such as, but not limited to, Task ID, Block Count, Block Address, Priority, Data Direction, Tag Request, Context ID, Reliable Write, and Forced Programming) extracted from both commands CMD44 and CMD45. In one embodiment, CMD 44 and CMD45 are coupled command pairs, and both are needed to complete the queuing operation. That is, if the next command issued after CMD 44 is not CMD45, or CMD45 is issued but an error condition is detected, the device behavior is undefined, and the host 252 may be expected to resend CMD44 and CMD45.

Once CMD44 and CMD45 are received, the command is placed in the command queue 180 and is processed by the storage system 100. When the processing is complete, the controller 102 sets a bit in the queue status register 190 corresponding to the processed command (e.g., if the command were held in the third entry in the queue, the controller 102 could set the third bit in the queue status register 190). In this embodiment, the storage system 100 does not initiate communication with the host 252; so, it is the responsibility of the host 252 to send a request to the storage system 100 for the status of the queue 190. This is shown in FIG. 4, with the host 252 sending a CMD 13 (QSR) command to the storage system 100, and the storage system 100 responding with the QSR value.

Figure 6:
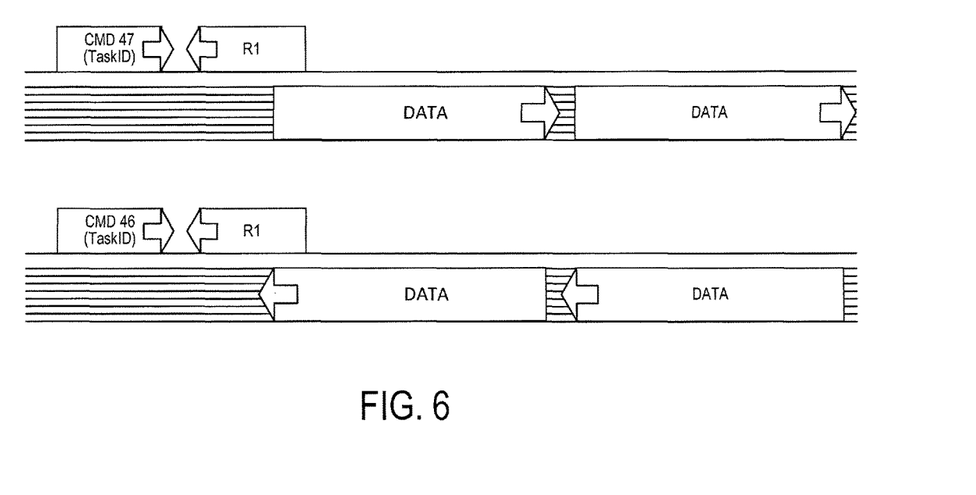
FIG. 6 is a diagram illustrating execution of write or read commands of an embodiment.

When the storage system 100, in response to CMD 13, indicates that one or more tasks are ready for execution, the host 252 can select one of these tasks (e.g., using the command queuing engine 340). That is, the host 252 can track the state of all queued tasks and may order the execution of any task that is ready for execution. If the selected task is a read command, the host 252 sends a CMD 46 (with the Task ID as its argument) to the storage system 100. The storage system 100 responds with R1 and starts the data transfer using the data portion of the bus 305. (The storage system 100 can instead respond with R1a, which is similar to R1 but contains a busy signal transmitted on the data portion of the bus 305). Similarly, if the selected task is a write command, the host 252 sends a CMD 47 (with the Task ID as its argument) to the storage system 100. The storage system 100 responds with R1 and starts the data transfer using the data portion of the bus 305. FIG. 6 shows the command and response communications, as well as the data transfers, between the host 252 and the storage system 100 for both read and write commands. (The memory 370 in the host 252 can be used to store data to be sent to the storage system 100 or received from the storage system 100.) After the last data block is read/written, the entries in the command queue 180 and queue status register 190 are cleared for that task.

While the data transfer for the read/write operation is taking place, the controller 102 in the storage system 100 may have completed processing another command in the command queue 180. As noted above, the storage system 100 does not initiate communication with the host 252 in this embodiment. So, as shown in FIG. 4, the host 252 issues another CMD 13 to get the latest status of the queue status register 190. If another command is ready, the host 252 can proceed with executing that command, sending another CMD 46 or 47.

Figure 7:
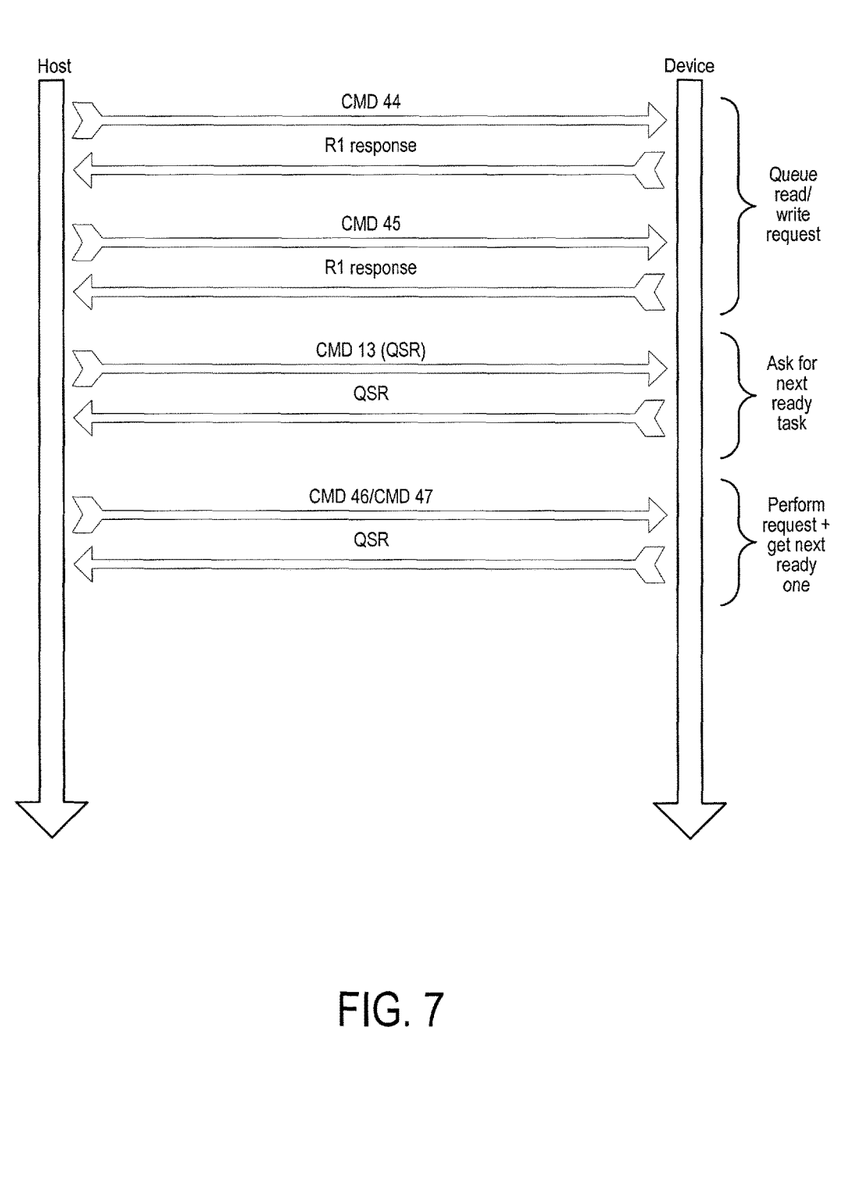
FIG. 7 is a flow chart of a command-queueing-and-execution process of an embodiment.

In the above example, the storage system 100 responds with an R1 or R1b response after receiving the read or write command (CMD 46 or 47). However, as noted above, due to the timing of the execution of the read or write command and when the R1 or R1b response is sent, any error in the execution of the read or write command would be reported in response to the next command. That is, the R1 or R1b response merely signals that the instruction to execute the read or write command was successfully received. It does not indicate that the actual execution of the command was successful. Again, as noted above, if an error is detected while executing the read or write command (i.e., in Execution Mode), the error would be reported in the response to the next command—not in the R1 or R1b response. So, the R1 or R1b response in this situation really does not provide useful information In one embodiment, for improved command flow, instead of returning an R1 or R1b response in response to receiving a CMD 46 or 47, the storage system 100 returns the status of the queue status register 180 instead. As shown in FIG. 7, in this embodiment, the storage system 100 sends the content of the queue status register 190 to the host 252 as a response to CMD46/CMD47, instead of the regular R1 or R1b response, thereby eliminating the need for the host 252 to send a CMD13. This embodiment provides the advantage of avoiding sending numerous commands between the host 252 and the storage system 100 before executing a command from the command queue 180. This reduces the number of commands required by the host 252 to trigger command execution, thus reducing protocol overhead and providing a more-optimal command flow, both of which improve both host 252 and the storage system 100 performance, as well as user experience. Also, because this embodiment is implemented with changes to the controller 102 in the storage system 100 (and not the host 252), these embodiments can be implemented without changing the eMMC standard.

This embodiment can be implemented in any suitable way. For example, the controller 102 in the storage system 100 (or a component in the controller, such as the command flow module 111) can be configured to send the content of the queue status register 190 to the host 252 in response to a read or write command, instead of waiting for a separate, specific request from the host 252. The controller 102 can implement this in software/firmware or exclusively in hardware. One algorithm for performing this function is the following: receive a request from the host 252 for an indication of which command(s) stored in the storage system 100 are ready for execution; in response to the request, provide the host 252 with the indication of which command(s) stored in the storage system 100 are ready for execution; receive an instruction from the host 252 to execute a command that is ready for execution; and in response to the instruction from the host 252 to execute the command, performs both of the following: executing the command and providing the host 252 with an updated indication of which command(s) stored in the storage system 100 are ready for execution, wherein the storage system 100 provides the host 252 with the updated indication without receiving a separate request from the host 252 for the updated indication.

Another possible algorithm is: store a command received from the host 252 in the command queue 180; process the command; store an indication in the queue status register 190 that the command is ready for execution; receive a status request from the host 252; in response to receiving the status request from the host 252, provide the host 252 with content of the queue status register 190; receive an instruction from the host 252 to execute a command in the command queue 180 that is ready for execution; and in response to receiving an instruction from the host 252 to execute the command, execute the command and provide the host 252 with updated content of the queue status register 190 instead of an acknowledgement response to the instruction.

As yet another implementation, the storage system 100 can comprise means for storing and processing commands; means for storing a status of the processing of the commands; and means for providing the status of the processing of the commands in response to an instruction from the host 252 to execute one of the commands. Again, a controller executing software/firmware or a pure hardware implementation can be used to implement the above or other types of algorithms. Of course, all of these implementations are merely examples, and other implementations can be used.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to farm a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for improved command flow in a storage system, the method comprising:
    receiving a status request from a host for an indication of which command(s) stored in the storage system are ready for execution;
    in response to the status request, providing the host with the indication of which command(s) stored in the storage system are ready for execution;
    receiving an instruction from the host to execute a command that is ready for execution, wherein the command is one of a read command or a write command; and
    in direct response to the instruction from the host to execute the command, performing both of:
        executing the command; and
        instead of providing the host with a separate instruction acknowledgement, providing the host with an updated indication of which other command(s) stored in the storage system are ready for execution and an indication of any errors in the execution of the command, wherein the storage system provides the host with the updated indication of which of the other command(s) stored in the storage system are ready for execution and the indication of any errors in the execution of the command without receiving a separate status request from the host for the updated indication and without requiring a separate error indication communication.

2. The method of claim 1, wherein the other command(s) are stored in a queue in the storage system.

3. The method of claim 1, wherein the updated indication of which of the other command(s) stored in the storage system are ready for execution is stored in a register in the storage system.

4. The method of claim 1, wherein the storage system comprises a three-dimensional memory.

5. The method of claim 1, wherein the storage system is embedded in the host.

6. The method of claim 1, wherein the storage system is removably connected to the host.

7. The method of claim 1, wherein the host is configured in accordance with Embedded Multi-Media Card (eMMC) protocols, and wherein the method further comprises providing the indication of any errors in the execution of the command to the host in accordance with the eMMC protocols.

8. A storage system comprising:
    a memory;
    a command queue;
    a queue status register; and
    a processor in communication with the memory, the command queue, and the queue status register, wherein the processor is configured to:
        store a command received from a host in the command queue;
        process the command;
        store an indication in the queue status register that the command is ready for execution;
        receive a status request from the host;

in response to receiving the status request from the host, provide the host with content of the queue status register, including an indication of command(s) stored in the storage system that are ready for execution;

receive an instruction from the host to execute a command in the command queue that is ready for execution, wherein the command is one of a read command or a write command; and execute the command in direct response to receiving the instruction from the host to execute the command and, instead of providing the host with a separate instruction acknowledgement, provide the host with updated content of the queue status register including an updated indication of which other command(s) stored in the storage system are ready for execution and an indication of any errors in the execution of the command, the processor is further configured to provide the host with the updated indication of which of the other command(s) stored in the storage system are ready for execution and the indication of any errors in the execution of the command without receiving a separate status request from the host for the updated indication and without requiring a separate error indication communication.

9. The storage system of claim 8, wherein the memory comprises a three-dimensional memory.

10. The storage system of claim 8, wherein the storage system is embedded in the host.

11. The storage system of claim 8, wherein the storage system is removably connected to the host.

12. The storage system of claim 8, wherein the host is configured in accordance with Embedded Multi-Media Card (eMMC) protocols, and wherein the processor is configured to provide the indication of any errors in the execution of the command to the host in accordance with the eMMC protocols.

13. A storage system comprising:
means for receiving a status request from a host for an indication of which command(s) stored in the storage system are ready for execution;

means for in response to the status request, providing the host with the indication of which command(s) stored in the storage system are ready for execution;

means for receiving an instruction from the host to execute a command that is ready for execution, wherein the command is one of a read command or a write command; and means for executing the command in direct response to the instruction from the host to execute the command; and means for providing the host with an updated indication of which other command(s) stored in the storage system are ready for execution, instead of providing the host with a separate instruction acknowledgement, and an indication of any errors in the execution of the command, wherein the storage system provides the host with the updated indication of which of the other command(s) stored in the storage system are ready for execution and the indication of any errors in the execution of the command without receiving a separate status request from the host for the updated indication and without requiring a separate error indication communication.

14. The storage system of claim 13, wherein the other command(s) are stored in a queue.

15. The storage system of claim 13, wherein the updated indication is stored in a register.

16. The storage system of claim 13, wherein the storage system comprises a three-dimensional memory.

17. The storage system of claim 13, wherein the storage system is embedded in the host.

18. The storage system of claim 13, wherein the storage system is removably connected to the host.

19. The storage system of claim 13, wherein the host is configured in accordance with Embedded Multi-Media Card (eMMC) protocols, and wherein the means for providing the host with the updated indication of which other command(s) stored in the storage system are ready for execution and the indication of any errors in the execution of the command provides the indication of any errors in the execution of the command in accordance with the eMMC protocols.

* * * * *